United States Patent [19]

Bhagavatula

[11] Patent Number: 4,715,679
[45] Date of Patent: Dec. 29, 1987

[54] LOW DISPERSION, LOW-LOSS SINGLE-MODE OPTICAL WAVEGUIDE

[75] Inventor: Venkata A. Bhagavatula, Corning, N.Y.

[73] Assignee: Corning Glass Works, Corning, N.Y.

[21] Appl. No.: 9,820

[22] Filed: Feb. 2, 1987

Related U.S. Application Data

[63] Continuation of Ser. No. 496,560, May 20, 1983, abandoned, which is a continuation-in-part of Ser. No. 328,369, Dec. 7, 1981, abandoned.

[51] Int. Cl.⁴ .............................................. G02B 6/22
[52] U.S. Cl. .............................. 350/96.33; 350/96.30; 350/96.31
[58] Field of Search .............. 350/96.29, 96.30, 96.31, 350/96.33, 96.34

[56] References Cited

U.S. PATENT DOCUMENTS

| | | | |
|---|---|---|---|
| 3,997,241 | 12/1976 | Nishida et al. | 350/96.33 |
| 4,184,744 | 1/1980 | Onoda et al. | 350/96.33 |
| 4,300,930 | 11/1981 | Chang | 350/96.30 X |
| 4,372,648 | 2/1983 | Black | 350/96.33 |
| 4,402,570 | 9/1983 | Chang | 350/96.30 |
| 4,406,518 | 9/1983 | Matsumura et al. | 350/96.31 |
| 4,412,722 | 11/1983 | Carnevale et al. | 350/96.31 |

FOREIGN PATENT DOCUMENTS

| | | | |
|---|---|---|---|
| 2427351 | 1/1976 | Fed. Rep. of Germany | 350/96.31 |
| 52-29234 | 3/1977 | Japan | 350/96.30 |
| 56-02923 | 1/1981 | Japan. | |

OTHER PUBLICATIONS

White et al., "Zero Total Dispersion In Step-Index Monomode Fibres at ...", *Electronics Lett.*, vol. 15, No. 13, Jun. 1979, pp. 396-397.
Gambling et al., "Zero Total Dispersion in Graded-Index Single-Mode Fibres", *Electronics Lett.*, vol. 15, No. 15, Jul. 1979, pp. 474-476.

*Primary Examiner*—John Lee
*Attorney, Agent, or Firm*—W. J. Simmons, Jr.

[57] ABSTRACT

Disclosed is an optical waveguide fiber having a core surrounded by a layer of cladding material. The core is characterized in that it includes a region of depressed refractive index. The inner radius $a_i$ of this region is greater than zero, and the outer radius $a_o$ thereof is less than the core radius. By appropriately selecting the core index depression characteristics such as radial location, width, depth and shape, a fiber having the desired waveguide dispersion characteristics can be designed. Dispersion minimization over a wide wavelength range can be achieved, without adverse effect on system loss.

30 Claims, 10 Drawing Figures

LOW DISPERSION, LOW-LOSS SINGLE-MODE OPTICAL WAVEGUIDE

CROSS-REFERENCE TO RELATED APPLICATION

This is a continuation of application Ser. No. 496,560 filed on May 20, 1983 which is a continuation-in-part of application Ser. No. 328,369 filed on Dec. 7, 1981, both now abandoned.

BACKGROUND OF THE INVENTION

The present invention relates to an optical waveguide fiber for transmitting light wave energy in a single mode.

Single-mode optical waveguide fibers have been developed that achieve transmission losses as low as 0.5 dB/km and 0.2 dB/km at wavelengths of 1300 nm and 1550 nm, respectively. Because of their low loss and because of the high bandwidths generally attributed to single-mode fibers, they are attractive as potential long distance transmission lines. However, their potentially high bandwidth can be achieved only if the design is optimized so that the total dispersion $D_t$ for the $HE_{11}$ mode is equal to zero or as near as possible to zero at the operating wavelength.

In single-mode waveguides the total dispersion is governed by the material dispersion $D_m$ and the waveguide dispersion $D_w$. For a given fiber composition the material dispersion varies as a function of wavelength. For example, the material dispersion versus wavelength curve passes through zero dispersion at a wavelength near 1280 nm for high silica content fibers. Single-mode fibers can be designed which exhibit zero total dispersion at any wavelength in a range of wavelengths above that wavelength at which the material dispersion curve passes through zero dispersion. This can be achieved by tailoring the waveguide dispersion to balance out the material dispersion at some specified wavelength which is selected because of low fiber attenuation and/or availability of light sources. The waveguide dispersion can be tailored by varying the core radius a, the core index profile or the core-cladding relative index difference $\Delta$. The term $\Delta$ is defined by the equation $\Delta = (n_1^2 - n_2^2)/2n_1^2$ wherein $n_1$ is the peak refractive index of the core and $n_2$ is the cladding refractive index. Techniques for tailoring the zero dispersion wavelength are taught in the article by U. C. Paek et al. entitled "Dispersionless Single-Mode Light Guides With $\alpha$ Index Profiles", The Bell System Technical Journal, Volume 60, No. 5, May-June 1981, pp. 583-598 and the article by L. G. Cohen entitled "Tailoring Zero Chromatic Dispersion Into The 1.5-1.6 μm Low-Loss Spectral Region of Single-Mode Fibers", Electronics Letters, Volume 15, No. 12, June 7, 1979, pp. 134-135.

Whereas the designs taught in the aforementioned Paek et al. and Cohen et al. articles can result in a tailoring of the zero dispersion wavelength, they adversely affect other parameters. To achieve lowest system loss, there must be optimization of parameters such as spot size $w_o$ and the ratio $w_o/a$, which determine splice loss and microbend loss, respectively. Also, work done on step-index single-mode waveguides having a $\Delta$ of about 0.3% indicates that such a value of $\Delta$ may be too low insofar as microbend loss is concerned. For conventional fibers having step-index or $\alpha$-type core index profiles and having $\Delta$-values greater than about 0.3%, it is difficult to meet the requirement that the zero dispersion wavelength $\lambda_o$ be quite close, i.e., within 5 nm, to the laser source wavelength when the source wavelength is chosen to be about 1300 nm in order to reduce the loss contribution due to OH absorption which peaks at 1380 nm.

The Paek et al. publication states that as the wavelength gets longer, the guide radius must get smaller and that at longer wavelengths a much larger amount of material dispersion must be compensated for by waveguide dispersion. This requires greater precision in the waveguide parameters than when the guide is designed to operate at the zero of material dispersion. If the waveguide radius is made too small in order to balance out material dispersion, microbending losses become unacceptably high.

The W-type waveguide disclosed in U.S. Pat. No. 3,997,241 issued to S. Nishida et al. offers an additional parameter which can be varied in order to vary the waveguide dispersion. This fiber comprises a core having a uniform, relatively high refractive index $n_1$ surrounded by an inner cladding layer having a relatively low refractive index $qn_1$ and an outer cladding layer having an intermediate value of refractive index $pn_1$. Since this design results in an increase of $V_c$ to a value calculated to be 3.8327, it enables light to be propagated in a single mode through a core having a radius greater than that which would be permitted in conventional step index waveguides. The normalized frequency V is expressed by the formula:

$$V = \frac{2\pi a}{\lambda} \sqrt{n_1^2 - n_2^2}$$

The term $V_c$ designates the single-mode cutoff value of V. Also, bending losses are reduced by the Nishida design. This design can achieve a total dispersion that is zero or near zero over a broad range of wavelengths, but in order to achieve such broad band operation, the intermediate layer index $qn_1$ should be relatively low and the outer cladding index $pn_1$ should be relatively close to the core index. In accordance with the teachings of the Nishida et al. patent, the quantity $(n-pn)/(n-qn)$ should be less than 0.1. Such a small ratio of $(n-pn)/(n-qn)$ causes manufacturing tolerance to be critical, and slight changes in the refractive index of a layer can greatly affect the slope of the waveguide dispersion curve. As the slope of the waveguide dispersion curve varies from its design value, the width of the wavelength range at which low dispersion operation can be achieved is correspondingly reduced.

The optical fiber of the Nishida et al. patent has a lower value of normalized frequency $V_1'$ below which single-mode propagation does not exist. As shown in FIG. 2 of that patent, single-mode propagation occurs in that range of normalized frequency between $V_1'$ and $V_2'$. Thus, as the index $pn_1$ of the outer cladding is increased in order to satisfy the preferred relationship for the quantity $(n-pn)/(n-qn)$, the V-value range over which single-mode operation is practical becomes small, again making the design sensitive to manufacturing tolerances.

SUMMARY OF THE INVENTION

It is therefore an object of the present invention to provide a single-mode optical waveguide which exhibits low dispersion over a wide band of wavelengths and which is not subject to the aforementioned limitations of the prior art.

A further object of this invention is to provide a single-mode optical waveguide having a relatively large core radius and exhibiting relatively low attenuation due to microbending.

Another object is to provide a single-mode optical waveguide having minimal dispersion over a wide wavelength range without lowest order mode cutoff, or with the lowest order mode cutoff far removed from the operating region.

The optical waveguide fiber of the present invention comprises a core of transparent material having a maximum refractive index $n_1$ surrounded by a layer of transparent cladding material having a refractive index $n_2$ which is lower than $n_1$. The invention is characterized in that the core includes at least one region of depressed refractive index. The inner radius of the innermost of the regions of depressed refractive index is greater than zero and the maximum radius of the outermost of the regions is less than the overall radius of the core.

DESCRIPTION OF THE PREFERRED EMBODIMENTS

The present invention relates to a single-mode optical waveguide fiber having a core including one or more regions of depressed refractive index.

Figure 1:
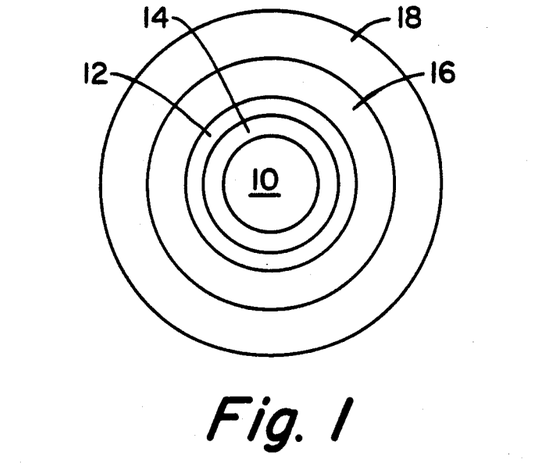
FIG. 1 shows a cross-sectional view of an optical waveguide fiber in accordance with the present invention.
Figure 2:
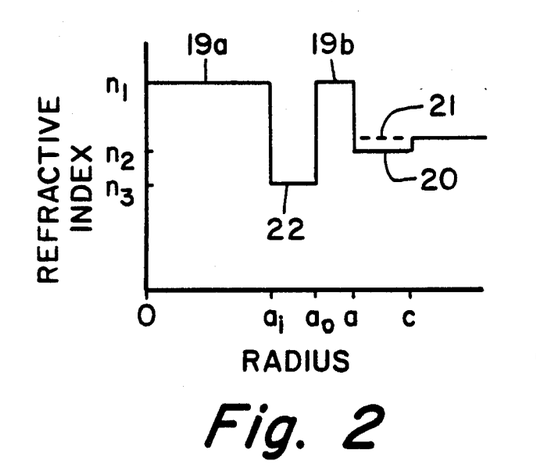
FIGS. 2, 3 and 7 through 10 are illustrative of numerous refractive index profiles which satisfy the conditions of the present invention.

The optical waveguide of FIG. 1 comprises a core having inner and outer regions 10 and 12 separated by a single region 14 of depressed refractive index $n_3$. One of the many refractive index profiles which satisfies the conditions of the present invention is illustrated in FIG. 2, wherein inner core region 19a and outer core region 19b both exhibit a refractive index $n_1$. Even though the refractive indices of these two core regions are the same, they may be formed of different compositions. The core is surrounded by cladding layer 16 of refractive index $n_2$. The cladding may have a depressed refractive index as illustrated by solid line 20 or a non-depressed refractive index as illustrated by dashed line 21. Refractive index $n_3$ can be less than $n_2$ as indicated by line 22, or it can be equal to or greater than $n_2$. The effect of the index depression is to modify the light energy propagation characteristics of a fiber to provide a desired relationship between waveguide dispersion and wavelength. If the quantity $(n_1-n_2)/(n_1-n_3)$ is as small as 0.1 the aforementioned effect exists, but manufacturing tolerances become critical. Thus, given the manufacturing processes and fiber compositions employed at the present time, a small change in a physical property of a fiber could result in a large change in waveguide dispersion characteristics when $(n_1-n_2)/(n_1-n_3)$ is 0.1. When the ratio $(n_1-n_2)/(n_1-n_3)$ is about 2.0 or greater, the beneficial effect of the design of the present invention becomes negligible. Therefore, the ratio $(n_1-n_2)/(n_1-n_3)$ should be less than 2.0.

Figure 3:
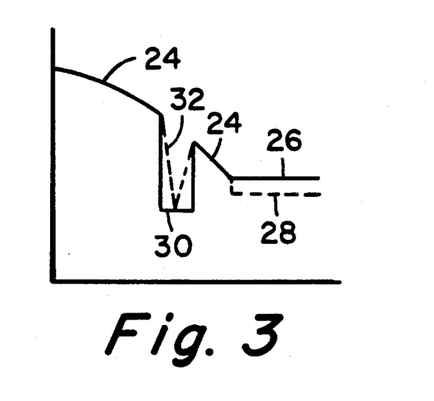

Whereas the core profile illustrated in FIG. 2 is that of a step index waveguide, other types of core profiles including α-profiles can be employed. The term "α-profile" is used herein to mean that the refractive index of the core is defined by the equation $n(r)=n_o[1-\Delta(r/a)^\alpha]$ where $n_o$ is the refractive index at the fiber axis. Curve 24 of FIG. 3 represents an α-profile wherein α equals 2. The refractive index of the cladding may have the same value as the edge of the core, as shown by solid line 26, or the refractive index of the cladding may be lower than that at the outer edge of the core as shown by dashed line 28.

The shape of the core index depression refractive index profile is a variable that has an effect on the propagation characteristics of the fiber. Instead of being flat as illustrated in the lower most portion 30 of the core profile in FIG. 3, the index depression could be rounded or even pointed as illustrated by dashed line 32.

By controlling the radial position, depth, width and shape of the index depression, the propagation characteristics of the waveguide can be suitably modified to meet different requirements imposed on a single mode system. For example, assuming a given type of core index profile, different types of index depressions are required to obtain zero dispersion operation at different system wavelengths.

Figure 4:
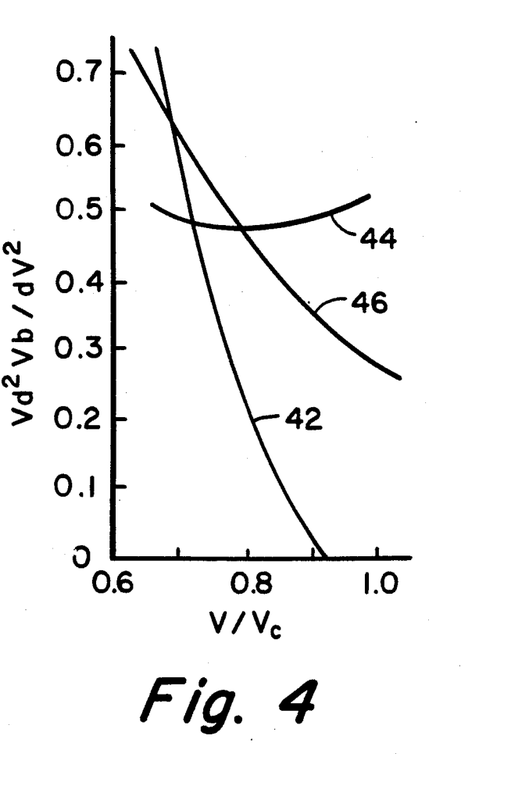
FIG. 4 is a graph of the quantity $Vd^2Vb/dV^2$ plotted as a function of the ratio $V/V_c$.

The manner in which the design of the present invention can be employed to produce optical waveguides having widely differing dispersion chracteristics can be seen from the following description, reference being made to the graph of FIG. 4. In that figure, the quantity $Vd^2(Vb)/dV^2$ is plotted as a function of the ratio $V/V_c$. The quantity $Vd^2(Vb)/dV^2$ is related to the waveguide dispersion $D_w$ as follows $$D_w = -\frac{n_2\Delta}{c\lambda}\left[\frac{Vd^2(Vb)}{dV^2}\right]$$

where C is the speed of light, λ is the wavelength of light, b is the normalized propagation constant. The graph of FIG. 4 enables one to compare the relative waveguide dispersions that can be obtained at different V-values for different fiber core profiles. Single mode operation takes place at values of $V/V_c$ less than 1.0. It is generally desirable to operate an optical waveguide fiber at a value of $V/V_c$ near 1.0 to minimize microbend loss. It is generally undesirable to operate a waveguide at $V/V_c$ values below 0.6. At such low values, core size is small and microbend loss tends to be large, and fiber characteristics are more sensitive to manufacturing variations.

Curves 42 and 44 are representative of waveguide dispersion characteristics of fibers having core index profiles of the type illustrated in FIG. 2, the parameters of the index depression being different. In the fiber characterized by curve 42, $a_i=0.6a$, $a_o=0.9a$ and the ratio $(n_1-n_2)/(n_1-n_3)=0.75$. In the fiber characterized by curve 44, $a_i=0.4a$, $a_o=0.65a$ and the ratio $(n_1-n_2)/(n_1-n_3)=0.75$. Thus, the fibers characterized by curves 42 and 44 differ only in the radial position and the width of the core index depression.

Curve 42 crosses the x-axis at a value of $V/V_c$ close to but less than one. This is indicative of the fact that a fiber having such characteristics could be advantageously operated at a wavelength at or just above the zero material dispersion wavelength, said operating wavelength being near the single-mode cutoff wavelength. The steep slope of curve 42 suggests that the $D_w$ v. $\lambda$ curve will also exhibit a relatively large positive slope, a characteristic which gives rise to broad-banded, low dispersion operation.

Curve 44 is representative of a fiber which is capable of supplying a relatively large amount of waveguide dispersion while operating near the single-mode cutoff wavelength. Since material dispersion is relatively high at wavelengths greater than the OH-absorption peak at about 1400 nm, the fiber characterized by curve 44 would be able to supply the waveguide dispersion needed to balance out the material dispersion at wavelengths greater than 1400 nm.

Curve 46 is representative of a fiber having an $\alpha = 1$ core index profile. Although this fiber is capable of operating at values of $V/V_c$ near 1.0, it is not capable of balancing out as much material dispersion as the fiber represented by curve 44, assuming operation at the same V-value.

Figure 5:
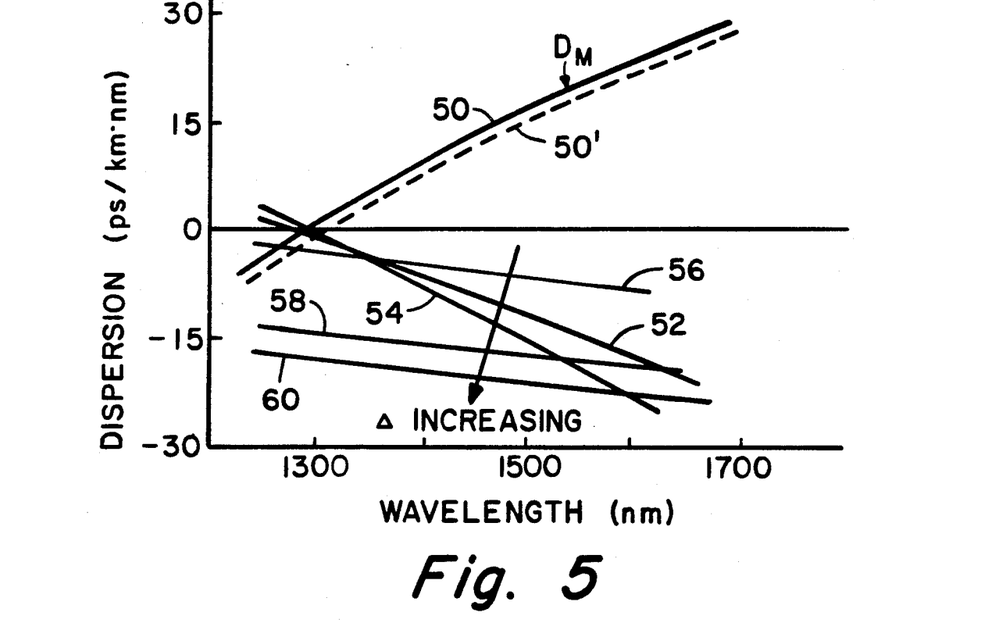
FIGS. 5 and 6 are dispersion v. wavelength curves for two fibers designed in accordance with the present invention but having different core index depression characteristics.

Referring momentarily to FIG. 5, curve 50 represents the material dispersion of an optical waveguide fiber having a core, the inner and outer regions of which are formed of silica doped with about 3 mole percent $GeO_2$, a depression formed of silica doped with about 1.7 mole percent fluorine and a depressed index cladding formed of silica doped with about 1.0 mole percent fluorine. Curve 50' is for a similar fiber except that the inner and outer core regions are formed of silica doped with about 8 mole percent $GeO_2$. Knowing the shape and zero crossover point of the material dispersion curve, one could choose a particular core index profile from among the various curves of FIG. 4 to achieve low dispersion operation at a particular wavelength in the manner described above. For example, if it were desired to operate at a system wavelength of 1300 nm, i.e., for a design with a cutoff wavelength $\lambda_c$ of about 1250 nm, the waveguide dispersion would have to be as small as possible at that wavelength since the material dispersion is very small at 1300 nm. For single mode operation near 1300 nm the quantity $Vd^2(Vb)/dV^2$ has to be small for values of $V/V_c$ near 1.0. Curve 42 which represents one of the possible core index depression designs of the present invention, passes through zero at a $V/V_c$ value of 0.91. This indicates that such a design would be suitable for balancing out the waveguide dispersion at 1300 nm.

FIG. 5 illustrates why the core index depression design characterized by curve 42 of FIG. 4 is advantageous for system wavelengths around 1300 nm. For low dispersion operation over a wide range of wavelengths, the waveguide dispersion curve should have a zero dispersion intercept at a wavelength near that of the material dispersion curve 50. By appropriately selecting the core index depression characteristics and the fiber $\Delta$-value, the material dispersion can be substantially balanced out over a wide range of wavelengths.

Curves 52 and 54 of FIG. 5 are dispersion curves of optical waveguide fibers having a core index design characterized by curve 42 of FIG. 4. The fiber cladding is assumed to be silica, and the values of $\Delta$ for curves 52 and 54 are 0.75% and 0.97%, respectively. The material dispersion is zero at about 1300 nm. The point of zero waveguide dispersion can also be made to occur at 1300 nm by appropriately selecting the V-value of the fiber. Curves 52 and 54 have relatively steep slopes which are useful for balancing out material dispersion over very large bands of wavelengths.

Curve 56 is a dispersion curve of another fiber having a core index design characterized by curve 42 of FIG. 4, wherein $\Delta$ is 0.5%. As described in greater detail hereinbelow, this fiber exhibits a zero dispersion wavelength of 1305 nm and a cutoff wavelength of 1120 nm. Since the slope of curve 56 is not as great as that of curve 54, the fiber characterized by curve 56 cannot provide low dispersion operation over as wide a band of wavelengths.

Curves 58 and 60, which represent the waveguide dispersion of fibers having an $\alpha = 1$ profile, are included for comparison purposes. The $\Delta$-values of the fibers represented by curves 58 and 60 are 1.0% and 1.3%, respectively. It can be seen that the zero dispersion intercept of the waveguide dispersion curve will occur at about 1300 nm for this type of fiber only when $\Delta$ is made unacceptably low.

Figure 6:
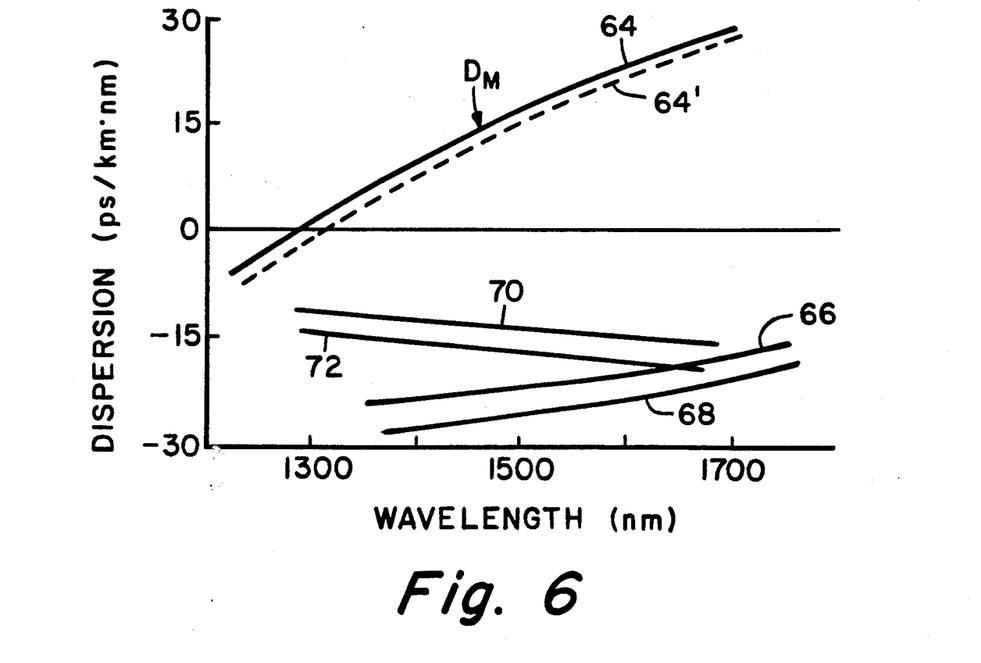

In FIG. 6 curves 64 and 64', which duplicate material dispersion curves 50 and 50' of FIG. 5, illustrate the fact that large waveguide dispersion is needed for zero dispersion operation at a wavelength of about 1500 nm or longer. Curves 70 and 72 represent fibers having an $\alpha = 1$ index profile and $\alpha$-values of 1.0% and 1.3%, respectively. Curves 66 and 68 are for fibers characterized by curve 44 of FIG. 4 and having $\Delta$-values of 0.75% and 0.97%, respectively. The fiber corresponding to curve 66 would provide zero dispersion operation at about 1550 nm.

The graphs of FIGS. 4–6 can be generated in a number of ways by those skilled in the art. Wave equations can be solved for a given fiber refractive index profile in accordance with the techniques advanced in the publications: C. Yeh et al. "Computing the Propagation Characteristics of Radially Stratified Fibers: an Efficient Method", Applied Optics, Vol. 16, 1977, pp. 483–493 and L. G. Cohen et al. "Correlation Between Numerical Predictions and Measurements of Single-Mode Fiber Dispersion Characteristics", Applied Optics, Vol. 19, 1980, pp. 2007–2010. Alternatively, the fibers can be fabricated and the dispersion measured in accordance with techniques advanced in the publications: L. G. Cohen et al. "A Universal Fiber Optic (UFO) Measurement System Based on a Near IR Fiber Raman Laser", IEEE Journal of Quantum Mechanics, Vol. QE-14, 1978, p. 855 and C. Lin et al. "Pulse Delay Measurements in the Zero-Material Dispersion Region for Germanium and Phosphorus Doped Silica Fibers", Electronics Letters, Vol. 14, 1978, pp. 170–172.

Optical waveguide fibers having core index profiles in accordance with the present invention can be fabricated by conventional vapor deposition processes. A theoretical example will be given to illustrate a method of fabrication of a fiber designed for operation at 1315 nm. A process such as that disclosed in U.S. Pat. No. 4,217,027 can be employed. Reference is made to FIGS. 1 and 2 for a description of the various layers deposited in the formation of the preform, it being noted that FIG. 1 is a cross-sectional view of the resultant fiber. A fused silica tube is employed as the substrate tube which forms outer cladding layer 18. Layer 18 may function as the cladding layer of index $n_2$, but it is preferred that a layer 16 of refractive index $n_2'$ depressed below that of cladding layer 18 be employed so that less dopant concentration is required in the core to achieve a given value of $\Delta$. This results in a lower material dispersion, thus making it easier to achieve a value of $\lambda_o$ that is equal to or less than about 1315 nm. Layer 16 can comprise silica doped with about 1 mole percent fluorine. Up to 1.0 mole percent $P_2O_5$ may be added to layer 16 to lower the softening point temperature of that layer, thereby improving process convenience. Outer core region 12 is formed by depositing a layer of silica doped with about 3 mole percent $GeO_2$ on the inner surface of layer 16. Index depression layer 14 is formed by depositing a layer of silica doped with about 1.7 mole percent fluorine. Finally, the central core region 10 is formed by depositing another layer of silica doped with about 3 mole percent $GeO_2$.

The preform is collapsed and drawn into an optical waveguide fiber having the following characteristics. The radius of core 12 is 6.2 μm. Region 14 of depressed refractive index has an outer diameter of 5.6 μm and an inner diameter of 3.6 μm. Region 16 of depressed index cladding material should have a radius of about 15 μm. Refractive indices $n_1$, $n_2$ and $n_3$ are 1.463, 1.456 and 1.4508, respectively. The cutoff value $V_c$ of the normalized frequency is about 5.0, and the cutoff wavelength $\lambda_c$ is about 1115 nm. The relative refractive index difference $\Delta$ is 0.3%. The spot size $w_o$ is about 3.7 μm. The waveguide dispersion characteristic of this fiber is represented by curve 56 of FIG. 5. It is noted that the core radius of 6.2 μm is almost twice the core radius of a comparable step index fiber having no index depression within the core.

Another theoretical example will be given to illustrate a method of fabrication of a fiber designed for low dispersion operation over a broader wavelength range between about 1300 nm and 1550 nm. A process similar to that of the previously described example can be employed. A fused silica tube is employed as the substrate tube which forms outer cladding layer 18. Layer 16 can comprise silica doped with about 1 mole percent fluorine. Outer core region 12 is formed by depositing a layer of silica doped with about 4.5 mole percent $GeO_2$ on the inner surface of layer 16. Index depression layer 14 is formed by depositing a layer of silica doped with about 2.6 mole percent fluorine. Finally, the central core region 10 is formed by depositing another layer of silica doped with about 4.5 mole percent $GeO_2$.

The preform is collapsed and drawn into an optical waveguide fiber having the following characteristics. The radius of core 12 is about 6.7 μm. Region 14 of depressed refractive index has an outer diameter of about 5.5 μm and an inner diameter of about 3.3 μm. Region 16 of depressed index cladding material should have a radius greater than about 15 μm. Refractive indices $n_1$, $n_2$ and $n_3$ are 1.465, 1.456 and 1.447, respectively. The cutoff value $V_c$ of the normalized frequency is about 5.0, and the cutoff wavelength $\lambda_c$ is about 1115 nm. The relative refractive index difference $\Delta$ is 0.5%. The spot size $w_o$ is about 5 μm. The waveguide dispersion characteristic of this fiber is similar to curve 54 of FIG. 5. It is noted that the core radius of 6.7 μm is almost twice the core radius of a comparable step index fiber having no index depression within the core.

Whereas the refractive index profiles illustrated in FIGS. 2 and 3 have a single region of depressed refractive index in the core, the present invention also contemplates fiber cores having two or more regions of depressed refractive index. FIGS. 7 through 10 are illustrative of such fibers.

Figure 7:
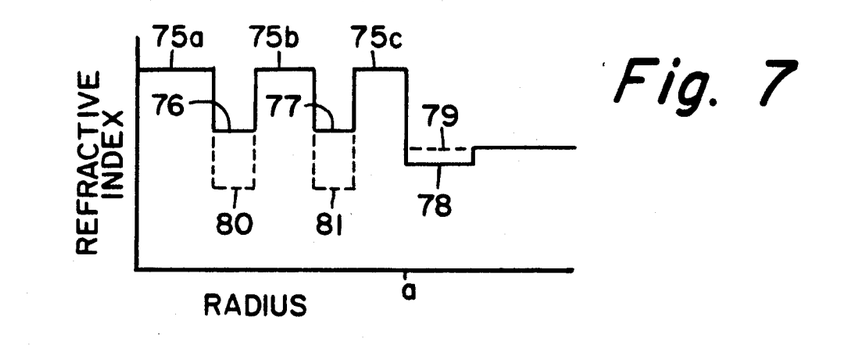

As shown in FIG. 7 the core regions 75a and 75b are separated by depressed index region 76, and core regions 75b and 75c are separated by depressed index region 77. The cladding may have a depressed refractive index as illustrated by solid line 78 or a non-depressed refractive index as illustrated by dashed line 79. The refractive indices of the depressions can be greater than that of the cladding as illustrated by the solid lines 76 and 77, or they may be lower than that of the cladding as illustrated by dashed lines 80 and 81.

Figure 8:
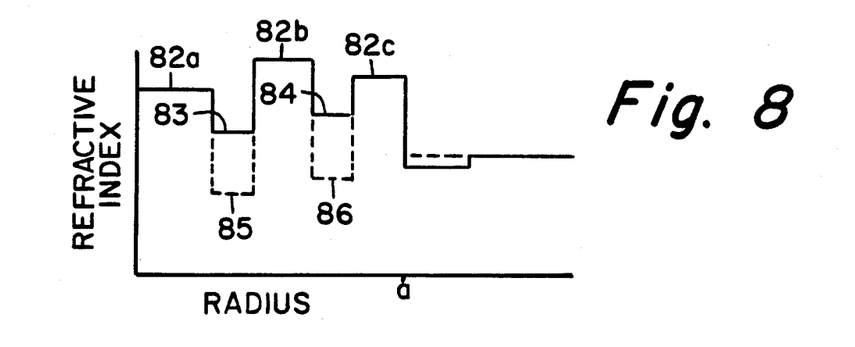

FIG. 8 shows a refractive index profile similar to that of FIG. 7 and is further illustrative of the fact that each of the core regions 82a, 82b and 82c may have a different refractive index value and that the refractive indices of depressed index regions 83 and 84 and regions 85 and 86 may be different.

Figure 9:
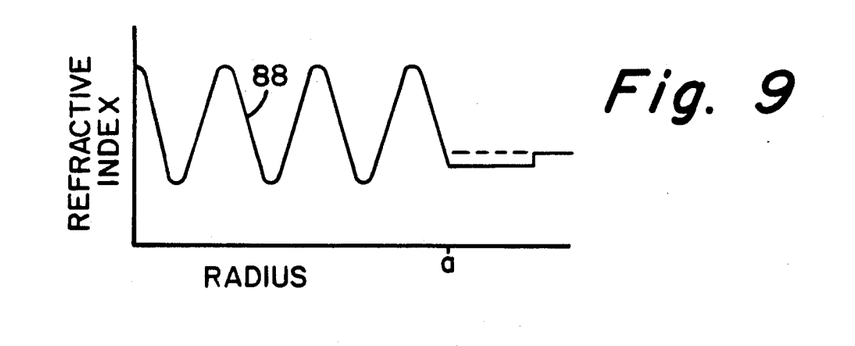

FIG. 9 illustrates the fact that the refractive index peaks and depressions may be rounded, and indeed, the refractive index curve 88 of the core may vary sinusoidally (with sin/cos type of index variations). The index profiles for the design in FIG. 9 can be represented by the following expression:

$$n(r) = \frac{(n_o + n_d)}{2} - \frac{(n_o - n_d)}{2} \sin\left[ m\pi \frac{(r)}{2} + \phi \right] \quad r < a$$

$$= n_{clad} \quad r \geq a$$

In the above expression, m represents the number of oscillations the index profile undergoes and $\phi$ is the phase lag parameter. For $\phi = 90°$, the distribution is co-sinsoidal. The variables in this design that can be used to change the propagation characteristics are m, $\phi$ and $n_d$ in addition to $n_1$, $n_{clad}$ and a.

Calculations have shown that for $m > 10$, the index variations are too rapid for the mode to follow. The mode effectively sees only an average index. But in the case where the core radial propagation constant U, which is defined by $(V^2 - \beta^2)^{\frac{1}{2}}$, matches the periodicity of the sinusoidal perturbations, it is possible for resonances to take place. At these points, the propagation characteristics can drastically change. For this condition U is approximately equal to $\pi m/a$. At these points, the propagation constant, the dispersion etc. can be quite different from the conventional case. This property may be used to design single-mode waveguides with the required dispersion properties.

Figure 10:
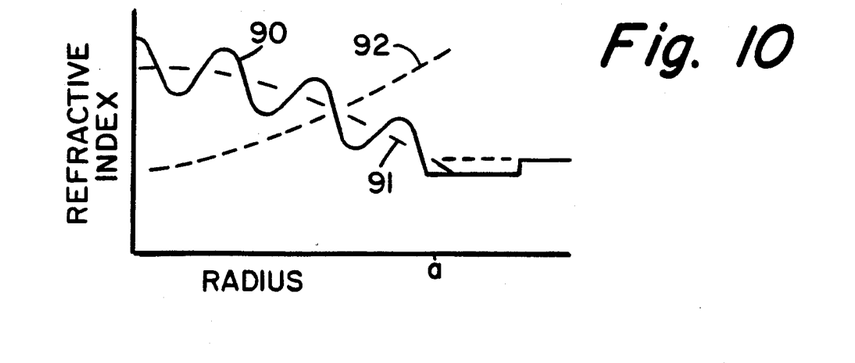

FIG. 10 shows that the sinusoidal variation 90 may decrease with increased radius along some average value represented by dashed line 91. Alternatively, the variations in the core refractive index may oscillate about some average value that increases with radius as represented by dashed line 92.

It can be seen that additional variables are available in the embodiments of FIGS. 7 through 10 as compared with the embodiments of FIGS. 2 and 3. Thus, it may be possible to achieve better optimization of the loss and dispersion properties of the fiber over a wide range of wavelengths when the fiber core possesses more than one index depression.

I claim:

1. A single-mode optical waveguide comprising
   a core of transparent material having a maximum refractive index $n_1$ and a radius a, and
   a layer of transparent cladding material on the outer surface of said core, the refractive index $n_2$ of said cladding being less than $n_1$,
said waveguide being characterized in that said core includes at least one annular region of depressed refractive index, the inner radius $a_i$ of the innermost of said regions being greater than zero and the maximum radius $a_o$ of the outermost of said regions of depressed refractive index being less than $a$, and in that the ratio $(n_1-n_2)/(n_1-n_3)$ is no greater than about 2.0, where $n_3$ is the minimum refractive index of said core region of depressed refractive index.

2. An optical waveguide in accordance with claim 1 wherein said core has a substantially uniform refractive index in the regions wherein the radius is between zero and $a_i$ and between $a_o$ and $a$.

3. An optical waveguide in accordance with claim 1 wherein the refractive index of the inner and outer regions of said core is radially inhomogeneous.

4. An optical waveguide in accordance with claim 3 wherein the refractive index $n(r)$ of the inner and outer regions of said core at any radius $r$ thereof varies in accordance with the equation $n(r)=n_1[1-\Delta(r/a)^\alpha]$, wherein $\alpha$ is a parameter between zero and infinity, and the refractive index $n_1$ occurs at the fiber axis.

5. An optical waveguide in accordance with claim 1 wherein said core includes only one region of depressed refractive index.

6. An optical waveguide in accordance with claim 1 wherein the refractive index $n(r)$ of the inner region of said core at any radius $r$ thereof varies in accordance with the equation $n(r)=n_1[1-\Delta(r/a)^\alpha]$, wherein $\alpha$ is a parameter between zero and infinity, and the refractive index $n_1$ occurs at the fiber axis.

7. A single-mode optical waveguide fiber comprising
a core of transparent material having a maximum refractive index $n_1$ and a radius $a$, and
a layer of transparent cladding material on the outer surface of said core, the refractive index $n_2$ of said cladding being less than $n_1$,
said waveguide being characterized in that said core comprises a central portion surrounded by at least two concentric segments, said central portion and the innermost of said concentric segments being separated by a region of depressed refractive index and each two adjacent segments being separated by a region of depressed refractive index, the inner radius $a_i$ of the innermost of said regions of depressed refractive index being greater than zero and the maximum radius $a_o$ of the outermost of said regions of depressed refractive index being less than $a$.

8. An optical waveguide in accordance with claim 7 wherein the maximum refractive index of each of said segments is the same.

9. An optical waveguide in accordance with claim 7 wherein the maximum refractive indices of said segments are not all the same.

10. An optical waveguide in accordance with claim 7 wherein the refractive indices of said regions of depressed refractive index are the same.

11. An optical waveguide in accordance with claim 7 wherein the refractive indices of said regions of depressed refractive index are not the same.

12. An optical waveguide in accordance with claim 7 wherein the composite refractive index of said central portion, said segments and said annular regions of depressed refractive index is sinusoidal.

13. An optical waveguide in accordance with claim 12 wherein said sinusoidal composite refractive index variation of said core is superimposed on a radially decreasing base value.

14. An optical waveguide in accordance with claim 12 wherein said sinusoidal composite refractive index variation of said core is superimposed on a radially increasing base value.

15. A single-mode optical waveguide fiber comprising
a core of transparent material having a maximum refractive index $n_1$ and a radius $a$, and
a layer of transparent cladding material on the outer surface of said core, the refractive index $n_2$ of said cladding being less than $n_1$,
said waveguide being characterized in that said core includes at least one annular region of depressed refractive index, the inner radius $a_i$ of the innermost of said regions being greater than zero and the maximum radius $a_o$ of the outermost of said regions of depressed refractive index being less than $a$, the refractive index profile of said single-mode fiber being such that:
  (a) said fiber is relatively free from microbending loss, and
  (b) said fiber exhibits a waveguide dispersion characteristic which is such that:
    (1) waveguide dispersion is relatively uniform with respect to wavelength so that the fiber is insensitive to manufacturing tolerances and
    (2) waveguide dispersion is relatively large at wavelengths greater than 1400 nm so that large values of material dispersion can be completely cancelled.

16. A single-mode optical waveguide fiber comprising
a core of transparent material having a maximum refractive index $n_1$ and a radius $a$, and
a layer of transparent cladding material on the outer surface of said core, the refractive index $n_2$ of said cladding being less than $n_1$,
said waveguide being characterized in that said core includes at least one annular region of depressed refractive index, the inner radius $a_i$ of the innermost of said regions being greater than zero and the maximum radius $a_o$ of the outermost of said regions of depressed refractive index being less than $a$, whereby said fiber exhibits low total dispersion over a wide band of wavelengths which includes the zero material dispersion wavelength and is relatively free from microbending loss.

17. A single-mode optical waveguide fiber comprising the following regions which are set forth in order of increasing radius:
a centrally located region of continuously decreasing refractive index, the maximum refractive index of which is $n_1$,
a first annular region of depressed refractive index, the minimum refractive index $n_3$ of which is no greater than the minimum refractive index of said centrally located region,
a second annular region having a refractive index greater than $n_3$, and
a cladding region having a refractive index $n_2$ which is less than the refractive index of said second annular region, the ratio $(n_1-n_2)/(n_1-n_3)$ being no greater than 2.

18. A single-mode optical waveguide fiber in accordance with claim 17 wherein said cladding region comprises a region of depressed refractive index $n_2'$ adjacent to said second annular region, wherein $n_2'$ is less than $n_2$.

19. A single-mode optical fiber comprising a centrally located region having a refractive index $n_{central}$ surrounded by four regions of increasing radius having the following refractive indices and radii ($n_{first}$, $R_{first}$), ($n_{se-}$ cond, $R_{second}$), ($n_{third}$, $R_{third}$) and ($n_{fourth}$, $R_{fourth}$), respectively, wherein:

$$R_{fourth} > R_{third} > R_{second} > R_{first}$$

and $$n_{central} > n_{second} > n_{fourth} > n_{third} > n_{first},$$

each of said regions being formed of relatively low-loss, optical quality glass, whereby a single-mode signal propagating in said fiber experiences low total dispersion over a wide band of wavelengths and is relatively free from microbending loss.

20. The fiber according to claim 19 wherein the radius $R_{fourth}$ is the outer radius of said fiber.

21. A single-mode optical fiber comprising a core region having a refractive index $n_c$ and a radius $R_c$ surrounded by four layers having refractive indices and radii ($n_1$, $R_1$), ($n_2$, $R_2$), ($n_3$, $R_3$), and ($n_4$, $R_4$), respectively, the optical fiber exhibiting a low total dispersion over a predetermined band of wavelengths, the single-mode signal being transmitted primarily in the core region and in the first three layers.

22. A single-mode optical fiber comprising at least five concentric regions, the first central region having a refractive index $n_c$ and a radius $R_c$, surround by first, second, third and fourth regions having refractive indices and radii ($n_1$, $R_1$), ($n_2$, $R_2$), ($n_3$, $R_3$), and ($n_4$, $R_4$), respectively, where $R_4 > R_3 > R_2 > R_1 > R_c$ and where $n_c \neq n_1$, $n_1 \neq n_2$, $n_2 \neq n_3$ and $n_3 \neq n_4$, the optical fiber exhibiting a low total dispersion over a predetermined wide band of wavelengths.

23. A single-mode optical fiber comprising at least five concentric regions, the first central region having a refractive index $n_c$ and a radius $R_c$, surrounded by first, second, third and fourth regions having refractive indices and radii ($n_1$, $R_1$), ($n_2$, $R_2$), ($n_3$, $R_3$), and ($n_4$, $R_4$), respectively, where $R_4 > R_3 > R_2 > R_1 > R_c$ and where $n_c > n_1$, $n_1 \neq n_2$, $n_2 \neq n_3$ and $n_3 \neq n_4$, the optical fiber exhibiting a low total dispersion over a predetermined wide band of wavelengths.

24. A single-mode optical fiber comprising at least five concentric regions, the first central region having a refractive index $n_c$ and a radius $R_c$, surrounded by first, second, third and fourth regions having refractive indices and radii ($n_1$, $R_1$), ($n_2$, $R_2$), ($n_3$, $R_3$), and ($n_4$, $R_4$), respectively, where $R_4 > R_3 > R_2 > R_1 > R_c$ and where $n_c > n_1$, $n_1 < n_2$, $n_2 > n_3$ and $n_3 < n_4$, the optical fiber exhibiting a low total dispersion over a predetermined wide band of wavelengths.

25. A single-mode optical waveguide fiber comprising
a core of transparent material having a maximum refractive index $n_1$ and a radius a, and
a layer of transparent cladding material on the outer surface of said core, the refractive index $n_2$ of said cladding being less than $n_1$,
said waveguide being characterized in that said core includes at least one annular region of depressed refractive index, the inner radius $a_i$ of the innermost of said regions being greater than zero and the maximum radius $a_o$ of the outermost of said regions of depressed refractive index being less than a, the refractive index profile of said single-mode fiber being such that said fiber exhibits the following waveguide dispersion characteristics:

(1) waveguide dispersion is relatively uniform with respect to wavelength so that the fiber is insensitive to manufacturing tolerances and
(2) waveguide dispersion is relatively large at wavelengths greater than 1400 nm so that large values of material dispersion can be completely cancelled.

26. A single-mode optical waveguide fiber comprising
a core of transparent material having a maximum refractive index $n_1$ and a radius a, and
a layer of transparent cladding material on the outer surface of said core, the refractive index $n_2$ of said cladding being less than $n_1$,
said waveguide being characterized in that said core includes at least one annular region of depressed refractive index, the inner radius $a_i$ of the innermost of said regions being greater than zero and the maximum radius $a_o$ of the outermost of said regions of depressed refractive index being less than a, the refractive index profile of said single-mode fiber being such that said fiber exhibits the following waveguide dispersion characteristic:

(1) waveguide dispersion is relatively uniform with respect to wavelength so that the fiber is insensitive to manufacturing tolerances and
(2) waveguide dispersion is relatively large at a band of wavelengths other than the wavelength at which the material dispersion is zero so that large values of material dispersion can be completely cancelled.

27. A single-mode optical waveguide fiber comprising
a core of transparent material having a maximum refractive index $n_1$ and a radius a, and
a layer of transparent cladding material on the outer surface of said core, the refractive index $n_2$ of said cladding being less than $n_1$,
said waveguide being characterized in that said core includes at least one annular region of depressed refractive index, the inner radius $a_i$ of the innermost of said regions being greater than zero and the maximum radius $a_o$ of the outermost of said regions of depressed refractive index being less than a, whereby said fiber exhibits low total dispersion over a wide band of wavelengths which includes the zero material dispersion wavelength.

28. A single-mode optical waveguide fiber comprising the following regions which are set forth in order of increasing radius:
a centrally located region of continuously decreasing refractive index, the maximum refractive index of which is $n_1$,
a first annular region of depressed refractive index, the minimum refractive index $n_3$ of which is no greater than the minimum refractive index of said centrally located region,
a second annular region having a refractive index greater than $n_3$, and
a cladding region having a refractive index $n_2$ which is less than the refractive index of said second annular region, whereby the total dispersion is equal to or near zero at that wavelength at which said fiber exhibits its lowest attenuation.

29. A single-mode optical waveguide comprising
a core of transparent material having a maximum refractive index $n_1$ and a radius a, and a layer of transparent cladding material on the outer surface of said core, the refractive index $n_2$ of said cladding being less than $n_1$, said waveguide being characterized in that said core includes at least one annular region of depressed refractive index, the inner radius $a_i$ of the innermost of said regions being greater than zero and the maximum radius $a_o$ of the outermost of said regions of depressed refractive index being less than a, whereby the total dispersion is equal to or near zero at that wavelength at which said fiber exhibits its lowest attenuation.

30. A single-mode optical waveguide fiber comprising a core of transparent material having a maximum refractive index $n_1$ and a radius a, and a layer of transparent cladding material on the outer surface of said core, the refractive index $n_2$ of said cladding being less than $n_1$, said waveguide being characterized in that said core includes at least one annular region of depressed refractive index, the inner radius $a_i$ of the innermost of said regions being greater than zero and the maximum radius $a_o$ of the outermost of said regions of depressed refractive index being less than a, the refractive index profile of said single-mode fiber being such that the quantity $Vd^2(Vb)/dV^2$ is relatively uniform with respect to $V/Vc$ wherein $$V = \frac{2\pi a}{\lambda} \sqrt{n_1^2 c - n_2^2},$$

$V_c$ = the single-mode cutoff value of V,
$\lambda$ = the wavelength of light, $$\frac{Vd^2(Vb)}{dV^2} = \frac{-D_w c \lambda}{n_2 \Delta},$$

c = the speed of light,
$D_w$ = the waveguide dispersion, and
$\Delta = (n_1^2 - n_2^2)/2n_1^2$.

* * * * *